April 11, 1939.   H. N. WADE   2,154,223
DEVICE FOR SUPPRESSING PULSATIONS IN FLUID STREAMS
Filed Oct. 26, 1936
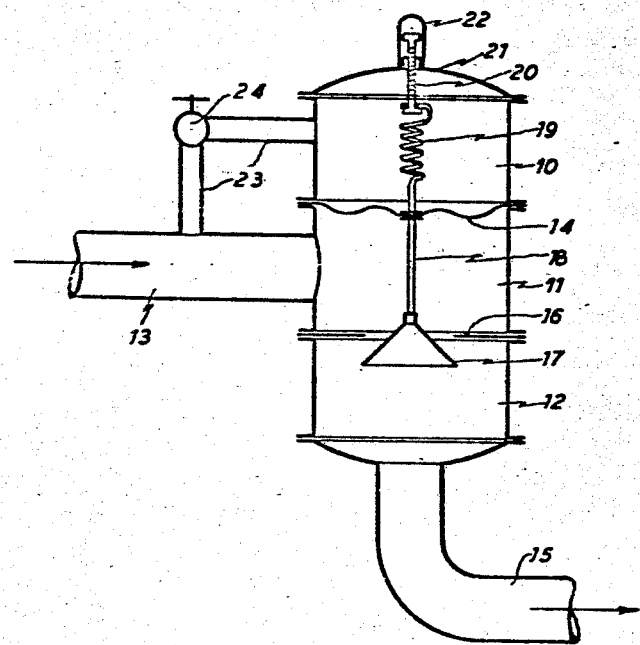
HENRY N. WADE
*INVENTOR*

Patented Apr. 11, 1939

2,154,223

UNITED STATES PATENT OFFICE 2,154,223

DEVICE FOR SUPPRESSING PULSATIONS IN FLUID STREAMS

Henry N. Wade, Los Angeles, Calif., assignor to Parkhill-Wade, Los Angeles, Calif., a corporation Application October 26, 1936, Serial No. 107,574

9 Claims. (Cl. 138—26)

The primary object of my invention is to provide means for dampening the pulsations produced in fluid conveying lines by the operation of the pumps or compressors by which the fluid is supplied to the line.

A corollary object of my invention is to provide means for obtaining accurate readings from flow meters located in proximity to air and gas compressors and in the lines attached to them.

It is well known that pumps of the reciprocating type handling either liquids or gases produce a pulsating flow and that this pulsation is felt on both the suction and the discharge side of the pump. It is also well known that these pulsations are transmitted through pipe lines to considerable distances from their source, specifically, to such distance as to permit the elasticity of the fluid, in the case of a gas, or of the system in which it is confined, in the case of a liquid, to absorb the variation in pressure occasioned by the stroking of the pump.

In the case of liquids the pulsation of the stream is felt mainly as a "hammer" which may be highly destructive to pipe and fittings, but in the operation of a gas compressing system pulsation is objectionable mainly in that it renders difficult the metering of the gas stream at or adjacent either end of the compressor.

The meters used on large gas flows are usually of the orifice type, and when such meters are installed in the path of a pulsating gas flow they read "over" to an extent varying with the severity of the pulsation and which may be as great as 60% to 80% over the true reading. The actual extent of this error is immaterial as, no matter how small, it is variable with certain variations in operating conditions which are out of control. For this reason the error cannot be eliminated by the application of any predetermined correction factor. Obviously a meter reading containing an unknown and variable error is totally worthless.

Heretofore dependable meter readings have been obtained by one of two expedients. The first is to place the meter at such distance from the compressor that the elasticity of the gas in the line will absorb the pulsations and produce a flow having constant velocity at the point where it enters the meter. This distance is usually so great that the meter is practically useless to the station attendants to whom its indications are of the greatest use. The other expedient is to shorten the distance by placing a surge tank in the line and so throttling the outlet as to produce uniform velocity downstream from the throttling point. To make this second device effective the surge tank must be of large capacity and the pressure drop through the throttle considerable, resulting in an undesirable item of initial expense and a serious waste of power in compression.

I have discovered that it is possible to completely eliminate pulsation at a point which may, if desired, be immediately adjacent the pump or compressor, by interposing in the flow line a resistance which comes into effect only when the flow tends to increase and disappears during that portion of the pump cycle during which the flow tends to decrease, and that elimination of pulsation in this manner may be accomplished with only a slight and immaterial throttling of the flow and consequently with an immaterial increase in power consumption over that observed when pulsation is permitted.

A device adapted to the application of this principle in the pumping or compression of gases is diagrammatically shown in the attached drawing, it being understood that this drawing is illustrative only and subject to modification in many respects.

In the specific form illustrated the device consists of a cylindrical chamber divided into the three chambers 10, 11 and 12. The inlet gas pipe 13 connects directly into the middle chamber 11. This chamber is separated from the upper chamber 10 by a flexible diaphragm 14. The full equivalent of this diaphragm would be a loose fitting and light metallic piston.

Lower chamber 12 communicates directly with the outlet gas line 15 in which, in this instance, the orifice meter would be inserted. Chamber 12 also communicates with chamber 11 through the annular valve seat 16 which partially separates these two chambers. This opening is partially obstructed by a floating valve 17, shown as conical but which may be of any other form, this valve being suspended from diaphragm 14 by means of a rigid rod 18. The valve may be held in alignment by any form of guide not shown.

Valve 17 is normally urged toward its closed position in seat 16 by a spring 19, the tension of which may be adjusted by a turn-buckle 20 passing through the head 21 and covered by a gas-tight cap 22.

A pipe 23 including a throttling valve 24 affords communication, by way of inlet pipe 13 or otherwise, between the upper and middle chambers 11 and 12.

The device above described is operated by momentary unbalancing of pressures on the two sides of diaphragm 14, by which it is caused to move valve 17 in a closing direction when the pressure in the inlet pipe rises above normal and in an opening direction when the pressure falls below normal. The space between the valve and its seat, through which gas flows from the inlet to the outlet pipe, is thus restricted as the pressure rises and enlarged as it falls, and the variation in free area thus produced may, with proper adjustment of the controls, be caused to exactly compensate the variations in pressure upstream of the valve and thus produce uniformity of flow through the valve opening and, by consequence, uniformity of pressure in the lower chamber and outlet pipe.

To develop this in more detail, we may first assume a condition of no pulsation, in which the gas pressure in the inlet pipe is uniform. Chambers 11 and 12 being in communication through pipe 23 (valve 24 being at least partially open) the pressures in these chambers will be equal and the diaphragm will be free to move in either direction under the influence of any other force.

This force is the pressure of the gas in chamber 11 acting on the upper surface of valve 17 and opening it against the lifting action of spring 19. The valve thus throttles the normal flow of gas to an extent governed by the tension of the spring, which may desirably be made very low by suitable selection and adjustment.

We will assume next a condition of rapidly rising pressure in the inlet pipe, such as is produced by the rising side of a pulsation wave. Chamber 11, being in full communication with the inlet pipe, is subjected instantly to the increased pressure. Chamber 10, communicating with the inlet pipe only through the restricted opening provided by valve 24, comes to the increased pressure more slowly. Momentarily the pressures on the two faces of the diaphragm are unbalanced, the greater pressure being on its lower side. The diaphragm being of much greater area than valve 17, the diaphragm moves upwardly, carrying the valve with it and decreasing the free area of valve opening and thus increasing the throttling action of the valve.

This upward movement terminates when the pressure in chamber 10 has risen, by flow of gas through valve 24, to such level that the total pressure on the upper face of the diaphragm plus the total pressure on the upper face of valve 17 equals the pressure on the lower face of the diaphragm plus the pressure on the lower face of the valve. At this point the pressure in chamber 10 is still somewhat below the pressure in chamber 11, and the movement is reversed in direction as the pressure in the upper chamber approaches equality with that in chamber 11. When these pressures have become equalized the valve will have returned to the position which it would occupy, for any given rate of gas flow, under the condition of no pulsation.

The drop in pressure corresponding to the falling side of the pulsation wave produces the reverse of the above movements. The momentarily unbalanced pressure is exercised on the upper side of the diaphragm, the valve is carried downwardly or in an opening direction, and the throttling action of the valve is momentarily reduced or eliminated.

Thus the cycle for a single pulsation wave is one in which a valve having normally a relatively small throttling action on the gas flow is caused to exercise an increased resistance by increased inlet pressure and a decreased resistance by decreased inlet pressure.

It will be evident that the responsiveness of this device to pressure changes will be reduced in proportion to the weight of the moving parts, and for this reason the mass of diaphragm 14, rod 18 and valve 17 should be held to the smallest possible terms. This being done, the rate of response will be governed by the extent to which valve 24 restricts the flow of gas between the inlet pipe and the upper chamber, increased restriction reducing the speed of response to pressure changes and likewise increasing the lineal extent of the response, i. e., of valve travel for any given pressure change.

I claim as my invention:

1. In apparatus for dampening pulsations in a flowing stream of fluid: a valve normally restricting said flow; means for moving said valve in a closing direction at times when said flow tends to increase and in an opening direction at times when said flow tends to decrease, and means for adjusting the speed of response of said valve moving means to changes in rate of flow.

2. In apparatus for dampening pulsations in a flowing stream of fluid: a valve normally restricting said flow; means arranged to move said valve in a closing direction in response to increase in pressure upstream from said valve and in an opening direction in response to decrease in said pressure, and means for adjusting the speed of response of said valve moving means to said pressure changes.

3. In apparatus for dampening pulsations in a flowing stream of fluid: a valve interposed in the flowing stream of fluid; a chamber and a movable path of said stream; a chamber and a movable element therein, said element being operatively connected to open and close said valve and said chamber being in free fluid communication with said stream on one side of said element, and a controllably restricted means of communication between said stream and the portion of said chamber on the other side of said element.

4. In apparatus for dampening pulsations in a flowing stream of fluid: a substantially closed hollow body and a wall dividing said body into two chambers and comprising a movable pressure responsive element; inlet and outlet pipes communicating with one of said chambers; an outwardly opening valve interposed in said outlet; an operating connection between said valve and said movable element, and a restricted fluid channel connecting said chambers.

5. In apparatus for dampening pulsations in a flowing stream of fluid: a substantially closed hollow body and a flexible diaphragm dividing said body into two chambers; fluid inlet and outlet pipes communicating with one of said chambers; an outwardly opening valve interposed in said outlet; a stem connecting said valve with said diaphragm; a fluid channel connecting said chambers, and a manually operable valve interposed in said fluid channel.

6. In apparatus for dampening pulsations in a flowing stream of fluid: a valve arranged in the path of said flow; a movable element arranged to take the pressure of said flowing stream on both of its sides; an operative connection between said valve and said movable element whereby opening and closing movements of said valve are effected by unbalancing of pressure on the two sides of said element, and regulable means for equalizing momentary unbalancing of said pressure.

7. Apparatus for dampening pulsations in a flowing stream of fluid, comprising: throttling means interposed in the path of said stream; means for increasing and decreasing the flow resistance offered by said throttling means in relation to the rates of respective increase and decrease in pressure upstream from said throttling means, and means for returning said throttling means to a predetermined normal position after a pressure change in only one direction.

8. Apparatus for dampening pulsations in a flowing stream of fluid, comprising: a variable resistance means interposed in the path of said stream; means for increasing and decreasing the extent of the resistance offered by said variable means in response respectively to increase and decrease in pressure upstream from said variable means, and means for returning said variable means to its normal position during the maintenance of a changed upstream pressure.

9. Apparatus for dampening pulsations in a flowing stream of fluid, comprising: a variable flow resistor interposed in the path of said stream; means for varying the resistance produced by said resistor in relation to the rate of variation in pressure upstream only from said resistor, and means for returning said resistor to a predetermined normal position after each said variation in pressure occurs and while said variation is maintained.

HENRY N. WADE.